United States Patent
Wang et al.

(10) Patent No.: US 11,856,634 B2
(45) Date of Patent: Dec. 26, 2023

(54) METHOD AND DEVICE FOR CONTROLLING MOBILITY OF TERMINAL, AND TERMINAL

(71) Applicant: GUANGDONG OPPO MOBILE TELECOMMUNICATIONS CORP., LTD., Guangdong (CN)

(72) Inventors: Shukun Wang, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 472 days.

(21) Appl. No.: 17/236,723

(22) Filed: Apr. 21, 2021

(65) Prior Publication Data
US 2021/0243834 A1    Aug. 5, 2021

Related U.S. Application Data

(63) Continuation of application No. PCT/CN2018/111514, filed on Oct. 23, 2018.

(51) Int. Cl.
H04W 76/27    (2018.01)
H04W 76/30    (2018.01)
H04W 8/02    (2009.01)

(52) U.S. Cl.
CPC ............. *H04W 76/27* (2018.02); *H04W 8/02* (2013.01); *H04W 76/30* (2018.02)

(58) Field of Classification Search
CPC ........ H04W 8/02; H04W 76/27; H04W 76/30
See application file for complete search history.

(56) References Cited

U.S. PATENT DOCUMENTS

2017/0311278 A1    10/2017    Adjakple et al.
2017/0325283 A1    11/2017    Wu
(Continued)

FOREIGN PATENT DOCUMENTS

CN    108307543 A    7/2018
WO    2017184856 A1    10/2017
(Continued)

OTHER PUBLICATIONS

3GPP TSG-RAN WG2 #103bis Tdoc R2-1815576, Chengdu, China, Oct. 8-12, 2018, Agenda Item: 10.4.1.3.3, Source: Ericsson, Title: Support for Signalling only connection, Document for: Discussion. 5 pages.

(Continued)

*Primary Examiner* — Kent Krueger
(74) *Attorney, Agent, or Firm* — PERKINS COIE LLP

(57) ABSTRACT

A method for controlling mobility of a terminal includes: after receiving configuration of a Signal Radio Bearer (SRB) 1, the terminal enters a Radio Resource Control (RRC) connected state; in response to that the terminal in the RRC connected state does not receive configuration of a Data Radio Bearer (DRB) and/or configuration of an SRB2, the terminal reports, based on measurement configuration of the network side, a measurement result to the network side, wherein the measurement result is used by the network side to determine a target cell; and the terminal receives an RRC release message from the network side, wherein the RRC release message carries reference information of the target cell.

17 Claims, 10 Drawing Sheets

(56) References Cited

U.S. PATENT DOCUMENTS

| | | | |
|---|---|---|---|
| 2018/0035484 A1 | 2/2018 | Kim et al. | |
| 2018/0092155 A1 | 3/2018 | Hong et al. | |
| 2019/0174571 A1* | 6/2019 | Deenoo | H04W 36/30 |
| 2021/0051734 A1* | 2/2021 | Chang | H04W 76/27 |
| 2021/0120618 A1 | 4/2021 | Lee et al. | |
| 2021/0185513 A1* | 6/2021 | Liu | H04W 76/27 |

FOREIGN PATENT DOCUMENTS

| | | |
|---|---|---|
| WO | 2017191926 A1 | 11/2017 |
| WO | 2018174625 A1 | 9/2018 |

OTHER PUBLICATIONS

3GPP TSG-RAN WG2 NR AH Meeting 1807 R2-1809794, Montreal, Canada, Jul. 2-6, 2018, Agenda Item: 10.4.1.3.3, Source: Intel Corporation, Title: Signalling only Connection, Document for: Discussion. 4 pages.

First Office Action of the Chinese application No. 202110419250.9, dated Jan. 30, 2022. 10 pages with English translation.

International Search Report in the international application No. PCT/CN2018/111514, dated Jun. 24, 2019.

"3rd Generation Partnership Project; Technical Specification Group Radio Access Network; NR; Radio Resource Control (RRC) protocol specification (Release 15)", 3GPP Standard; Technical Specification; 3GPP TS 38.331., vol. RAN WG2, No. V15.3.0, Sep. 26, 2018 (Sep. 26, 2018), 445 pages.

OPPO: "Open issues for RRC signaling only connection", 3GPP Draft: R2-1816492; vol. RAN WG2, No. Spokane, USA; Nov. 12, 2018-Nov. 16, 2018 Nov. 12, 2018 (Nov. 12, 2018), XP051556070. 2 pages.

Supplementary European Search Report in the European application No. 18937688.2, dated Oct. 21, 2021. 11 pages.

Written Opinion of the International Search Authority in the international application No. PCT/CN2018/111514, dated Jun. 24, 2019. 9 pages with English translation.

* cited by examiner

METHOD AND DEVICE FOR CONTROLLING MOBILITY OF TERMINAL, AND TERMINAL

CROSS-REFERENCE TO RELATED APPLICATIONS

The application is a continuation application of PCT Application No. PCT/CN2018/111514 filed on Oct. 23, 2018, the disclosure of which is hereby incorporated by reference in its entity.

BACKGROUND

Mobility of a terminal in an idle state is based on a cell re-selection procedure of the terminal, and the mobility of the terminal in a Radio Resource Control (RRC) connected state is based on a handover controlled by a network side. During an RRC connection setup, after establishing a Signal Radio Bearer (SRB) 1, the terminal enters the RRC connected state and stops performing the cell re-selection procedure.

In a scenario that only involves the establishment of SRB1, the terminal already enters the RRC connected state and stops the cell re-selection procedure, and the network side does not support the handover in the scenario. Thus, the mobility of the terminal in this scenario is a problem that needs to be clarified.

SUMMARY

The present disclosure relates to the technical field of mobile communications, and particularly to a method and device for controlling mobility of a terminal, and a terminal.

The embodiments of the present disclosure provide a method for controlling mobility of a terminal, the method including: obtaining, by a terminal, a first threshold configured on a network side; after receiving configuration of a Signal Radio Bearer (SRB) 1, entering, by a terminal, a Radio Resource Control (RRC) connected state; and in response to that the terminal in the RRC connected state does not receive configuration of a Data Radio Bearer (DRB) and/or configuration of an SRB2, determining, by the terminal, whether to release an RRC connection and return to an idle state based on a measurement result of a serving cell and the first threshold.

The embodiments of the present disclosure provide a method for controlling mobility of a terminal, the method including: after receiving configuration of a Signal Radio Bearer (SRB) 1, entering, by the terminal, a Radio Resource Control (RRC) connected state; in response to that the terminal in the RRC connected state does not receive configuration of a Data Radio Bearer (DRB) and/or configuration of an SRB2, reporting, by the terminal based on measurement configuration of the network side, a measurement result to the network side, wherein the measurement result is used by the network side to determine a target cell; and receiving, by the terminal, an RRC release message from the network side, wherein the RRC release message carries reference information of the target cell.

The embodiments of the present disclosure provide a device for controlling mobility of a terminal, applied to a terminal, the device including: a memory storing processor-executable instructions: and a processor configured to execute the stored processor-executable instructions to perform operations of: obtaining a first threshold configured by a network side; after receiving configuration of a Signal Radio Bearer (SRB) 1, entering a Radio Resource Control (RRC) connected state; and in response to that the terminal in the RRC connected state does not receive configuration of a Data Radio Bearer (DRB) and/or configuration of an SRB2, determining, based on a measurement result of a serving cell and the first threshold, whether to release an RRC connection and return to an idle state.

BRIEF DESCRIPTION OF THE DRAWINGS

The drawings described herein are used to provide a further understanding of the disclosure and constitute a part of the disclosure. The exemplary embodiments and descriptions of the disclosure are used to explain the disclosure, and do not constitute an improper limitation of the present disclosure. In the drawings.

DETAILED DESCRIPTION

The technical solutions in the embodiments of the present disclosure will be described below in combination with the drawings in the embodiments of the present disclosure. Obviously, the described embodiments are a part of the embodiments of the present disclosure, not all of the embodiments. Based on the embodiments of the present disclosure, all other embodiments obtained by those of ordinary skill in the art without creative work fall within the protection scope of the present disclosure.

The technical solutions of the embodiments of the present disclosure may be applied to various communication systems, for example, a Global System of Mobile communication (GSM) system, a Code Division Multiple Access (CDMA) system, and a Wideband Code Division Multiple Access (WCDMA) system, General Packet Radio Service (GPRS), an Long Term Evolution (LTE) system, an LTE Frequency Division Duplex (FDD) system, an LTE Time Division Duplex (TDD), a Universal Mobile Telecommunication System (UMTS), a Worldwide Interoperability for Microwave Access (WiMAX) communication system or a 5th Generation (5G) system, etc.

Figure 1:
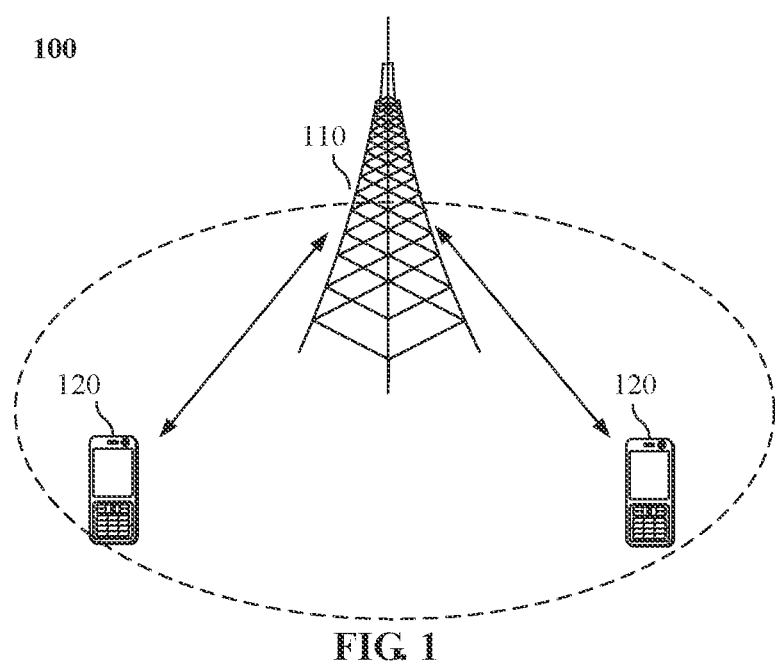
FIG. 1 is a schematic diagram of a communication system architecture according to an embodiment of the present disclosure.

Exemplarily, the communication system 100 applied in the embodiments of the present disclosure is shown in FIG. 1. The communication system 100 may include a network device 110, and the network device 110 may be a device that communicates with a terminal 120 (or called a communication terminal or a terminal). The network device 110 may provide communication coverage for a specific geographic area, and may communicate with terminals located in the coverage area. Optionally, the network device 110 may be a Base Transceiver Station (BTS) in the GSM system or the CDMA system, or a NodeB (NB) in the WCDMA system, or an Evolutional Node B (eNB or eNodeB) in the LTE system, or a wireless controller in a Cloud Radio Access Network (CRAN), or the network equipment can be a mobile switching center, a relay station, an access point, a vehicle-mounted device, wearable devices, hubs, switches, bridges, routers, network side devices in 5G networks, or network devices in a Public Land Mobile Network (PLMN) of a future evolution, etc.

The communication system 100 further includes at least one terminal 120 within the coverage of the network device 110. A "terminal device" used herein includes, but not limited to, a device arranged to receive/send a communication signal through a wired line connection, for example, through Public Switched Telephone Networks (PSTN), Digital Subscriber Line (DSL), digital cable, and direct cable connections, and/or another data connection/network, and/or through a wireless interface, for example, through a cellular network, a Wireless Local Area Networks (WLAN), a digital TV network like a Digital Video Broadcasting-Handheld (DVB-H) network, a satellite network and an Amplitude Modulated (AM)-Frequency Modulated (FM) broadcast transmitter, and/or via another communication terminal, and/or an Internet of Things (IoT) device. The terminal arranged to communicate through a wireless interface may be called a "wireless communication terminal", a "wireless terminal" or a "mobile terminal". Examples of a mobile terminal include, but not limited to, a satellite or a cellular phone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal 120 device may perform Device to Device (D2D) communication with another terminal device.

Optionally, the 5G system or the 5G network may also be called an New Radio (NR) system or an NR network.

A network device and two terminal devices are exemplarily shown in FIG. 1. Optionally, the communication system 10 may include multiple network devices and another number of terminal devices may be included in coverage of each network devices. There are no limits made thereto in the embodiments of the present disclosure.

Optionally, the communication system 100 may further include other network entities such as a network controller and a mobility management entity. There are no limits made thereto in the embodiments of the present disclosure.

It is to be understood that a device with a communication function in the network/system in the embodiments of the disclosure may be called a communication device. For example, for the communication system 100 shown in FIG. 1, communication devices may include the network device 110 and terminal 120 with communication function, and the network device 110 and the terminal 120 may be the specific devices mentioned above and will not be elaborated herein. The communication devices may further include other devices in the communication system 100, for example, other network entities like a network controller and a mobility management entity. There are no limits made thereto in the embodiments of the disclosure.

It is to be understood that terms "system" and "network" in the disclosure may usually be used interchangeably. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

In order to satisfy business speed, delay, high-speed mobility, and energy efficiency pursuit of people, and the diversity and complexity of business in future life, a 3rd Generation Partnership Project (3GPP) International Standards Organization began to develop 5th Generation (5G) mobile communication technology.

The main application scenarios of 5G are: enhanced Mobile Broadband (eMBB), Ultra Reliable Low Latency Communication (URLLC), and mass Machine Type Communication (mMTC).

The technical solutions in the embodiments of the disclosure are mainly applied to a 5G system. Of course, the technical solutions in the embodiments of the disclosure are not limited to the 5G system and may also be applied to mobile communication systems of other types. Main application scenarios in the 5G system will be described below:

1) An eMBB scenario, eMBB aims to enable a user to obtain a multimedia content, service and data, and its business requirements are growing very rapidly. Since eMBB may be deployed in different scenarios, such as indoors, urban areas, rural areas, etc., the business capabilities and requirements of eMBB vary greatly. Thus, the business must be analyzed in combination with specific deployment scenarios.
2) URLLC scenario, typical applications of URLLC include: industrial automation, power automation, telemedicine operations, traffic safety assurance, etc.
3) mMTC scenario, the typical features of URLLC include: high connection density, small data volume, delay-insensitive services, low-cost modules and long service life, etc.

The air interface part of 5G mobile communication technology is called New Radio (NR). In the early deployment of NR complete NR coverage is difficult to achieve. Thus, the typical network coverage is a combination of a Long Term Evolution (LTE) coverage and an NR coverage. In addition, in order to protect the early investment of mobile operators in LTE, a tight interworking mode between LTE and NR is proposed. Of course, NR cells can also be deployed independently.

In discussions of NE, it was agreed that in R15, the maximum channel bandwidth of each NR carrier is 100 MHz for low frequencies and 400 MHz for high frequencies, and the 100 MHz/400 MHz channel bandwidth is continuous. When the UE keeps working on a broadband carrier, the power consumption of the UE is very large. Thus, it is recommended that a Radio Frequency (RF) bandwidth of the UE can be adjusted according to the actual throughput of the UE.

The NR system supports a connection mode where there is only an RRC connection (that is, configuration of the SRB1), and there is no configuration of the DRB and/or configuration of the SRB2. The UE enters an RRC connected state after the establishment of SRB1 and stops performing cell re-selection procedure. However, in a scenario where there is no configuration of the DRB and/or the configuration of the SRB2, the network side does not support handover. The embodiments of the present disclosure clarify the mobility of a terminal in this scenario.

Figure 2:
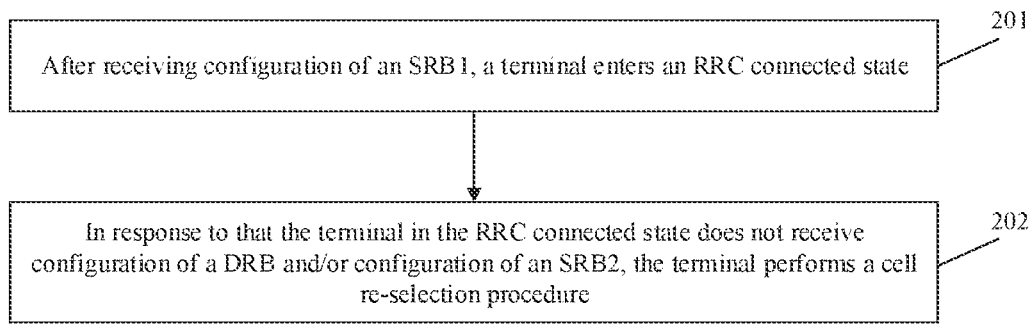
FIG. 2 is a first schematic flowchart of a method for controlling mobility of a terminal according to an embodiment of the present disclosure.

FIG. 2 is a first schematic flowchart of a method for controlling mobility of a terminal according to an embodiment of the present disclosure. As shown in FIG. 2, the method for controlling mobility of a terminal includes the following operations.

In operation 201, after receiving configuration of the SRB1, the terminal enters an RRC connected state.

In the embodiment of the present disclosure, the terminal may be any device capable of communicating with the network, such as a mobile phone, a tablet computer, a vehicle-mounted terminal, and a laptop.

In the embodiment of the present disclosure, the terminal receives the configuration of the SRB1 from the current serving cell, and after receiving the configuration of the SRB1, the terminal enters the RRC connected state.

For example, during the RRC connection setup, the UE transmits MSG3 (RRC connection setup request message) to gNB; gNB establishes SRB1 and transmits MSG4 (RRC connection setup message) to the UE, where MSG4 carries the configuration of the SRB1; after receiving the configuration of the SRB1, the UE enters the RRC connected state.

In operation 202, in response to that the terminal in the RRC connected state does not receive configuration of a Data Radio Bearer (DRB) and/or configuration of an SRB2, the terminal performs a cell re-selection procedure.

In the embodiment of the present disclosure, in response to that the terminal in the RRC connected state does not receive configuration of the DRB and/or configuration of the SRB2, the terminal performs the cell re-selection procedure. Herein, the cell re-selection procedure is the same as the cell re-selection procedure in an idle state.

It is to be noted that during the RRC connection setup, after the gNB transmits MSG4 to the UE, the gNB activates security, the UE transmits an RRC reconfiguration request message to the gNB, and the gNB transmits an RRC reconfiguration message to the UE. The RRC reconfiguration message carries the configuration of the DRB and/or the configuration of the SRB2. However, in response to that the UE in the RRC connected state does not receive configuration of the DRB and/or configuration of the SRB2, the terminal performs the cell re-selection procedure.

In the embodiment of the present disclosure, under condition that the terminal performs the cell re-selection procedure, in response to that receives the configuration of the DRB and/or the configuration of the SRB2, the terminal stops performing the cell re-selection procedure.

In the embodiment of the disclosure, in response to that the terminal performs the cell re-selection procedure and a cell re-selection event occurs under condition that the terminal does not receive the configuration of the DRB and/or the configuration of the SRB2, the terminal camps on a target cell corresponding to the cell re-selection event, releases the RRC connection and returns to the idle state.

For example, during the RRC connection setup, in response to that the UE does not receives the configuration of the DRB or the configuration of the SRB2 or both configuration of the SRB2 and the configuration of the DRB, even if the UE enters the RRC connected state, the UE still performs the cell re-selection procedure. In response to that the UE receives the configuration of the DRB or the configuration of the SRB2 or both the configuration of the SRB2 and the configuration of the DRB, the UE stops performing the cell re-selection procedure. In response to that a cell re-selection occurs when the UE does not receive the configuration of the DRB or the configuration of the SRB2 or both the configuration of the SRB2 and the configuration of the DRB, the UE camps on the target cell, releases the RRC connection and returns to the idle state.

Figure 3:
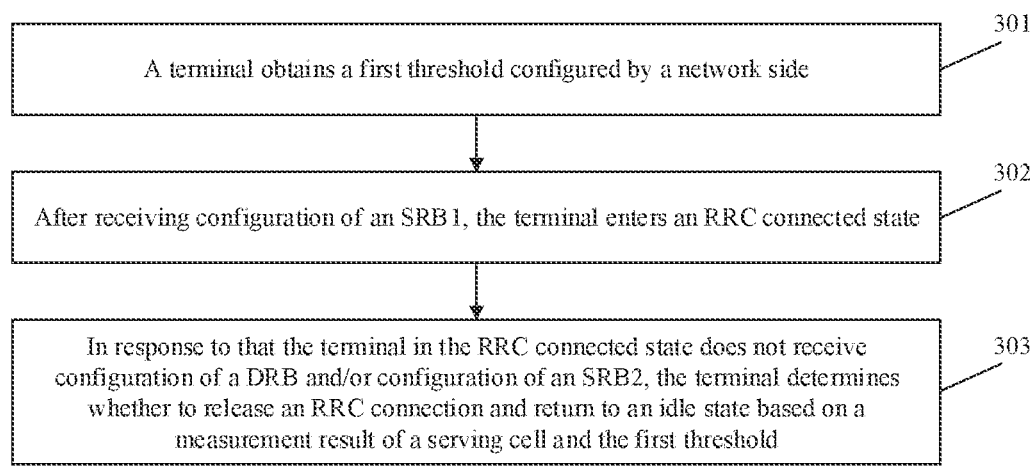
FIG. 3 is a second schematic flowchart of a method for controlling mobility of a terminal according to an embodiment of the present disclosure.

FIG. 3 is a second flowchart of a method for controlling mobility of a terminal provided by an embodiment of the present disclosure. As shown in FIG. 3, the method for controlling mobility of a terminal includes the following operations.

In operation 301, the terminal obtains a first threshold configured by the network side.

In the embodiments of the present disclosure, the terminal may be any device capable of communicating with the network, such as a mobile phone, a tablet computer, a vehicle-mounted terminal, and a laptop.

In the embodiment of the present disclosure, the terminal obtains the first threshold from system broadcast information or a UE dedicated signaling.

For example, the UE receives the RRC connection setup message that is transmitted by the gNB and carries the first threshold. The first threshold is, for example, a Reference Signal Received Power (RSRP) threshold.

In operation 302, after receiving configuration of an SRB1, the terminal enters an RRC connected state.

In the embodiment of the present disclosure, the terminal receives the configuration of the SRB1 from the current serving cell, and after receiving the configuration of the SRB1, the terminal enters the RRC connected state.

For example, during the RRC connection setup, the UE transmits MSG3 (RRC connection setup request message) to gNB: gNB establishes SRB1 and transmits MSG4 (RRC connection setup message) to the UE, where MSG4 carries the configuration of the SRB; after receiving the configuration of the SRB1, the UE enters the RRC connected state.

In operation 303, in response to that the terminal in the RRC connected state does not receive configuration of the DRB and/or configuration of the SRB2, the terminal determines, based on a measurement result of a serving cell and the first threshold, whether to release an RRC connection and return to an idle state.

In the embodiment of the present disclosure, in response to that the terminal in the RRC connected state does not receive configuration of the DRB and/or configuration of the SRB2, the terminal determines, based on a measurement result of a serving cell and the first threshold, whether to release an RRC connection and return to an idle state.

It is to be noted that during the RRC connection setup, after the gNB transmits MSG4 to the UE, the gNB activates security, the UE transmits an RRC reconfiguration request message to the gNB, and the gNB transmits an RRC reconfiguration message to the UE. The RRC reconfiguration message carries the configuration of the DRB and/or the configuration of the SRB2. However, in response to that the UE in the RRC connected state does not receive configuration of the DRB and/or configuration of the SRB2, the terminal determines, based on the measurement result of a serving cell and the first threshold, whether to release an RRC connection and return to an idle state.

Specifically, in response to that the measurement result of the serving cell is less than the first threshold, the terminal releases the RRC connection and returns to the idle state.

Figure 4:
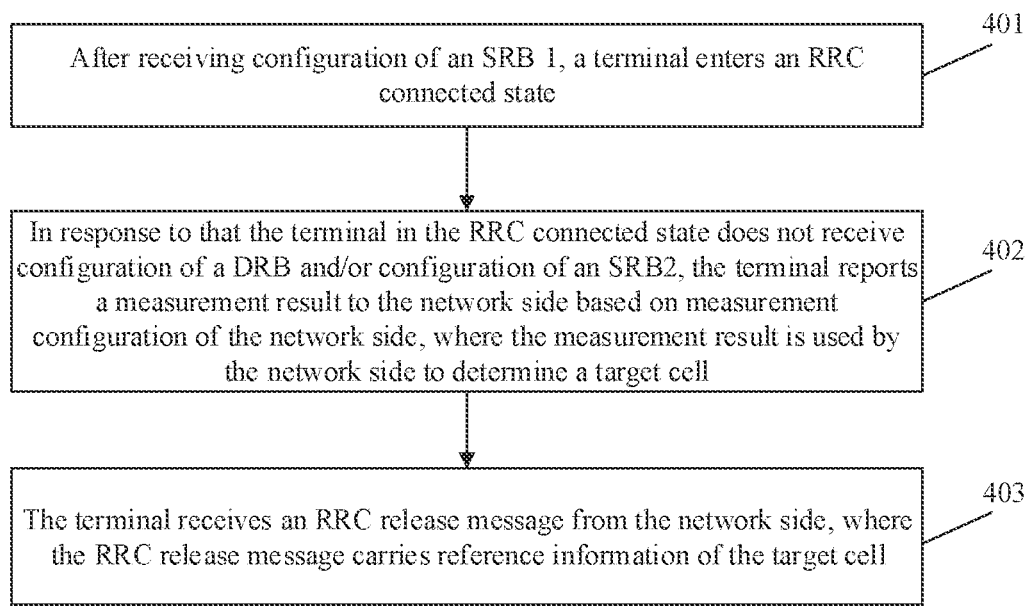
FIG. 4 is a third schematic flowchart of a method for controlling mobility of a terminal according to an embodiment of the present disclosure.

FIG. 4 is a third flowchart of a method for controlling mobility of a terminal provided by an embodiment of the present disclosure. As shown in FIG. 4, the method for controlling mobility of a terminal includes the following operations.

In operation 401, after receiving the configuration of the SRB1, the terminal enters an RRC connected state.

In the embodiments of the present disclosure, the terminal may be any device capable of communicating with the network, such as a mobile phone, a tablet computer, a vehicle-mounted terminal, and a laptop.

In the embodiment of the present disclosure, the terminal receives the configuration of the SRB1 from the current serving cell, and after receiving the configuration of the SRB1, the terminal enters the RRC connected state.

For example, during the RRC connection setup, the UE transmits MSG3 (RRC connection setup request message) to gNB; gNB establishes SRB1 and transmits MSG4 (RRC connection setup message) to the UE, where MSG4 carries the configuration of the SRB1: after receiving the configuration of the SRB1, the UE enters the RRC connected state.

In operation 402, in response to that the terminal in the RRC connected state does not receive configuration of the DRB and/or configuration of the SRB2, the terminal reports a measurement result to the network side based on measurement configuration of the network side, herein the measurement result is used by the network side to determine the target cell.

In the embodiment of the disclosure, in response to that the terminal in the RRC connected state does not receive configuration of the DRB and/or configuration of the SRB2, the terminal reports the measurement result to the network side based on measurement configuration of the network side, herein the measurement result is used by the network side to determine the target cell.

It is to be noted that during the RRC connection setup, after the gNB transmits MSG4 to the UE, the gNB activates security, the UE transmits an RRC reconfiguration request message to the gNB, and the gNB transmits an RRC reconfiguration message to the UE. The RRC reconfiguration message carries the configuration of the DRB and/or the configuration of the SRB2. However, in response to that the UE in the RRC connected state does not receive configuration of the DRB and/or configuration of the SRB2, the terminal reports a measurement result to the network side based on measurement configuration of the network side. The measurement result is used by the network side to determine the target cell.

In the above solution, the measurement configuration is carried in the RRC reconfiguration message. That is, the RRC reconfiguration message includes the measurement configuration, but does not include the configuration of the DRB and/or the configuration of the SRB2.

In operation 403, the terminal receives the RRC release message from the network side, herein the RRC release message carries the reference information of the target cell.

In the embodiments of the present disclosure, the reference information of the target cell includes at least one of: a Physical Cell Identifier (PCI), frequency information or Radio Access Type (RAT) information. Optionally, the RRC release message also carries system broadcast information of the target cell.

After receiving the RRC release message from the network side, the terminal releases the RRC connection and returns to the idle state.

Figure 5:
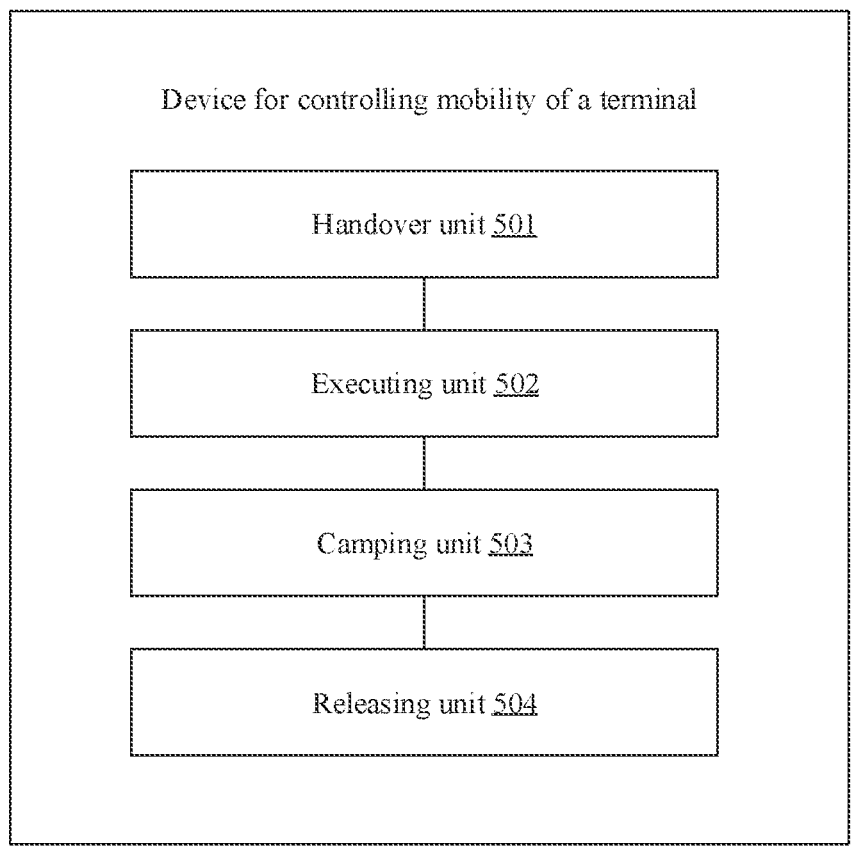
FIG. 5 is a first schematic structural diagram of a device for controlling mobility of a terminal according to an embodiment of the present disclosure.

FIG. 5 is a schematic diagram 1 of the structural composition of a device for controlling mobility of a terminal provided by an embodiment of the present disclosure. The device is applied to the terminal. As shown in FIG. 5, the device includes: a handover unit 501, and an executing unit 502.

The handover unit 501 is configured to: after receiving configuration of the SRB1, enter the RRC connected state.

The executing unit 502 is configured to: in response to that the terminal in the RRC connected state does not receive configuration of a Data Radio Bearer (DRB) and/or configuration of an SRB2, perform a cell re-selection procedure.

In an implementation, the executing unit 502 is further configured to: in response to that the terminal performs the cell re-selection procedure and receives the configuration of the DRB and/or the configuration of the SRB2, stop performing the cell re-selection procedure.

In an implementation, the device further includes a camping unit 503, and a releasing unit 504.

The camping unit 503 is configured to: in response to that a cell re-selection event occurs during the cell re-selection procedure, camp on a target cell corresponding to the cell re-selection event.

The releasing unit 504 is configured to release the RRC connection and return to the idle state.

In an implementation, the configuration of the SRB1 is carried in the RRC connection setup message.

Those skilled in the art should understand that the relevant description of the device for controlling mobility of a terminal in the embodiments of the present disclosure can be understood with reference to the relevant description of the method for controlling mobility of a terminal in the embodiments of the present disclosure.

Figure 6:
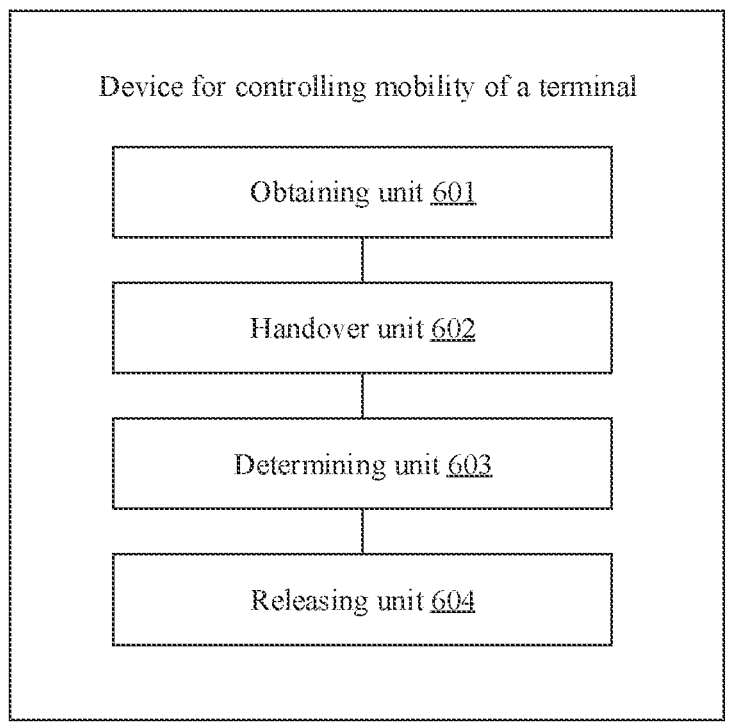
FIG. 6 is a second schematic structural diagram of a device for controlling mobility of a terminal according to an embodiment of the present disclosure.

FIG. 6 is a second schematic structural diagram of a device for controlling mobility of a terminal according to an embodiment of the present disclosure. The device is applied to the terminal. As shown in FIG. 6, the device includes: an obtaining unit 601, a handover unit 602, and a determining unit 603.

The obtaining unit 601 is configured to obtain the first threshold configured by the network side.

The handover unit 602 is configured to: after receiving configuration of the SRB1, enter the RRC connected state.

The determining unit 603 is configured to: in response to that the terminal in the RRC connected state does not receive configuration of the DRB and/or configuration of the SRB2, determine, based on a measurement result of a serving cell and the first threshold, whether to release an RRC connection and return to an idle state.

In an embodiment, the acquiring unit 601 is configured to obtain the first threshold from system broadcast information or a UE dedicated signaling.

In an embodiment, the device further includes a releasing unit 604.

The determining unit 603 is configured to: in response to that the measurement result of the serving cell is less than the first threshold, trigger the releasing unit to release an RRC connection and return to the idle state.

In an implementation, the configuration of the SRB1 is carried in the RRC connection setup message.

Those skilled in the art should understand that the relevant description of the device for controlling mobility of a terminal in the embodiments of the present disclosure can be understood with reference to the relevant description of the method for controlling mobility of a terminal in the embodiments of the present disclosure.

Figure 7:
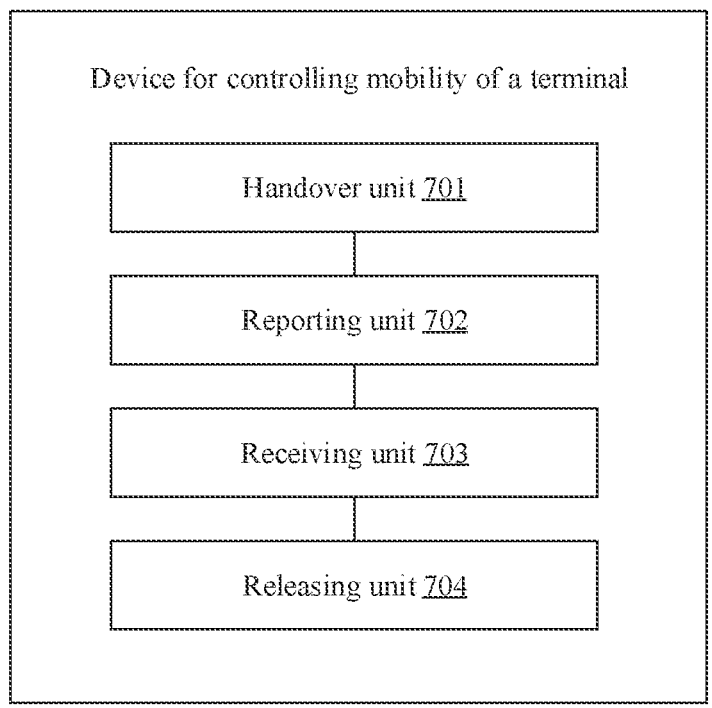
FIG. 7 is a third schematic structural diagram of a device for controlling mobility of a terminal according to an embodiment of the present disclosure.

FIG. 7 is a third schematic structural diagram of a device for controlling mobility of a terminal according to an embodiment of the present disclosure. The device is applied to a terminal. As shown in FIG. 7, the device includes: a handover unit 701, a reporting unit 702, and a receiving unit 703.

The handover unit 701 is configured to: after receiving configuration of the SRB1, enter the RRC connected state.

The reporting unit 702 is configured to: in response to that the terminal in the RRC connected state does not receive configuration of the DRB and/or configuration of the SRB2, report a measurement result to a network side based on measurement configuration of the network side, herein the measurement result is used by the network side to determine the target cell.

The receiving unit 703 is configured to receive the RRC release message from the network side, herein the RRC release message carries the reference information of the target cell.

In an implementation, the reference information of the target cell includes at least one of: the PCI, frequency information or RAT information.

In an implementation, the RRC release message further carries system broadcast information of the target cell.

In an implementation, the configuration of the SRB1 is carried in an RRC connection setup message, and the measurement configuration is carried in the RRC reconfiguration message.

In an implementation, the device further includes a releasing unit 704 configured to release the RRC connection and return to the idle state.

Those skilled in the art should understand that the relevant description of the device for controlling mobility of a terminal in the embodiments of the present disclosure can be understood with reference to the relevant description of the method for controlling mobility of a terminal in the embodiments of the present disclosure.

Figure 8:
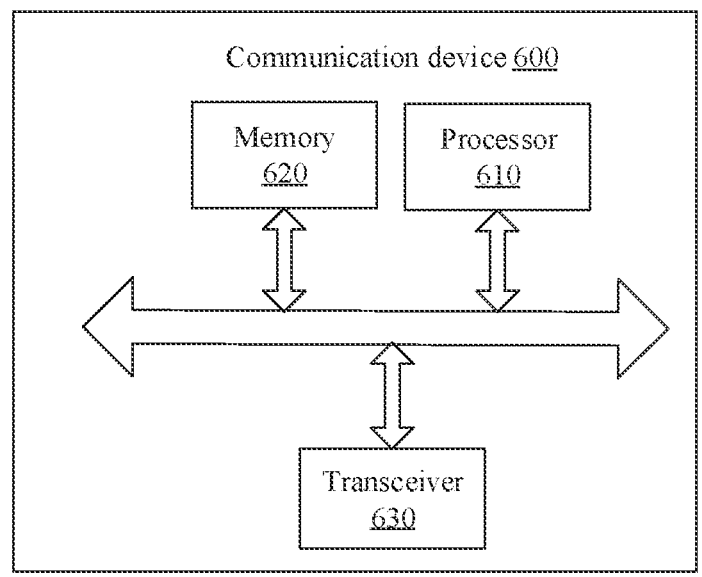
FIG. 8 is a schematic structural diagram of a communication device according to an embodiment of the present disclosure.

FIG. 8 is a schematic structural diagram of a communication device 600 according to an embodiment of the present disclosure. The communication device may be a terminal. The communication device 600 shown in FIG. 8 includes a processor 610, and the processor 610 may call and run a computer program in a memory to implement the method in the embodiment of the present disclosure.

Optionally, as shown in FIG. 8, the communication device 600 may further include a memory 620. Wherein the processor 610 may call and run the computer program in the memory 620 to implement the method in the embodiment of the present disclosure.

The memory 620 may be an independent device independent of the processor 610 and may also be integrated into the processor 610.

Optionally, as shown in FIG. 8, the communication device 600 may further include a transceiver 630, and the processor 610 may control the transceiver 630 to communicate with another devices. Specifically, the processor 610 may control the transceiver 630 to send information or data to the other device or to receive information or data from the other device.

The transceiver 630 may include a transmitter and a receiver. The transceiver 630 may further include antenna, and the number of antenna may be one or more.

Optionally, the communication device 600 may specifically be a network device in the embodiment of the disclosure, and the communication device 600 may be configured to implement corresponding flows implemented by the network device in each method in the embodiments of the disclosure. For simplicity, elaborations are omitted herein.

Optionally, the communication device 600 may specifically be the mobile terminal/terminal in the embodiments of the disclosure, and the communication device 600 may be configured to implement corresponding flows implemented by the mobile terminal/terminal device in each method in the embodiments of the disclosure. For simplicity, elaborations are omitted herein.

Figure 9:
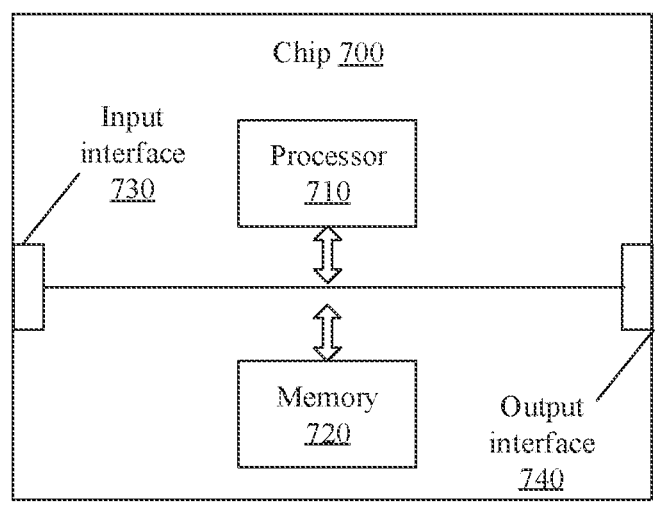
FIG. 9 is a schematic structural diagram of a chip according to an embodiment of the present disclosure.

FIG. 9 is a schematic structural diagram of a chip according to an embodiment of the disclosure. A chip 700 shown in FIG. 9 includes a processor 710, and the processor 710 may call and run a computer program in a memory to implement the methods in the embodiments of the disclosure.

Optionally, as shown in FIG. 9, the chip 700 may further include a memory 720. The processor 710 may call and run the computer program in the memory 720 to implement the methods in the embodiments of the disclosure.

The memory 720 may be an independent device independent of the processor 710 and may also be integrated into the processor 710.

Optionally, the chip 700 may further include an input interface 730. The processor 710 may control the input interface 730 to communicate with another device or chip, such as acquiring information or data from the other device or chip.

Optionally, the chip 700 may further include an output interface 740. The processor 710 may control the output interface 740 to communicate with the other device or chip, such as outputting information or data to the other device or chip.

Optionally, the chip may be applied to the network device in the embodiments of the disclosure, and the chip may implement corresponding flows implemented by the network device in each method in the embodiments of the disclosure. For simplicity, elaborations are omitted herein.

Optionally, the chip may be applied to the mobile terminal/terminal device in the embodiment of the disclosure, and the chip may implement corresponding flows implemented by the mobile terminal/terminal device in each method in the embodiment of the disclosure. For simplicity, elaborations are omitted herein.

It is to be understood that the chip mentioned in the embodiment of the disclosure may also be called a system-level chip, a system chip, a chip system or a system on chip, etc.

Figure 10:
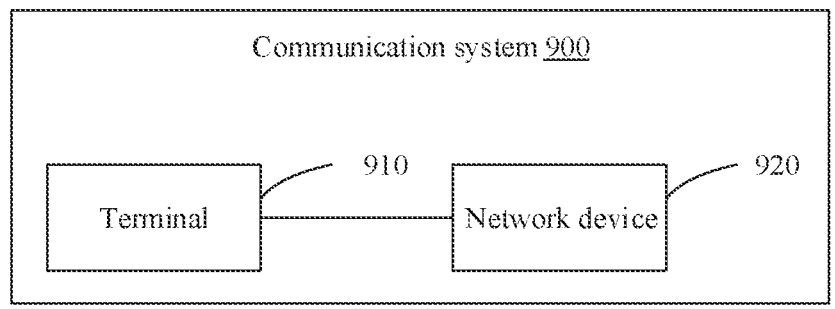
FIG. 10 is a schematic block diagram of a communication system according to an embodiment of the present disclosure.

FIG. 10 is a schematic block diagram of a communication system 900 according to an embodiment of the disclosure. As shown in FIG. 10, a communication system 900 includes a terminal device 910 and a network device 920.

The terminal device 910 may be configured to implement corresponding functions implemented by the terminal device in the above methods, and the network device 920 may be configured to implement corresponding functions implemented by the network device in the above methods. For simplicity, elaborations are omitted herein.

It is to be understood that the processor in the embodiment of the disclosure may be an integrated circuit chip and has a signal processing capability. In an implementation process, each step in the method embodiments may be completed by an integrated logical circuit in a hardware form in the processor or an instruction in a software form. The processor may be a general purpose processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The general purpose processor may be a microprocessor or the processor may also be any conventional processor and the like. The operations in the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations in the method in combination with the hardware.

It can be understood that the memory in the embodiment of the disclosure may be a volatile memory or a non-volatile memory, or may include both the volatile and non-volatile memories. The non-volatile memory may be a ROM, a PROM, an Erasable PROM (EPROM), an EEPROM or a flash memory. The volatile memory may be a RAM, and is used as an external high-speed cache. In an exemplary but non-limiting embodiment, RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method in the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method in the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method in the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method in the embodiments of the disclosure. For simplicity, elaborations are omitted herein.

The embodiments of the disclosure also provide a computer program.

Optionally, the computer program may be applied to a network device in the embodiments of the disclosure, and the computer program, when being executed in a computer, causes the computer to execute corresponding flows implemented by the network device in each method in the embodiments of the disclosure. For simplicity, elaborations are omitted herein.

Optionally, the computer program may be applied to a mobile terminal/terminal device in the embodiments of the disclosure, and the computer program, when being executed in the computer, causes the computer to execute corresponding flows implemented by the mobile terminal/terminal device in each method in the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical, mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

Described above are merely specific embodiments of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for controlling mobility of a terminal, comprising:
   obtaining, by a terminal, a first threshold configured by a network side;
   after receiving configuration of a Signal Radio Bearer (SRB) 1, entering, by the terminal, a Radio Resource Control (RRC) connected state; and
   in response to that the terminal in the RRC connected state does not receive configuration of a Data Radio Bearer (DRB) and/or configuration of an SRB2, determining, by the terminal, whether to release an RRC connection and return to an idle state based on a measurement result of a serving cell and the first threshold.

2. The method of claim 1, wherein obtaining, by the terminal, the first threshold configured by the network side comprises:
   obtaining, by the terminal, the first threshold from system broadcast information or a User Equipment (UE) dedicated signaling.

3. The method of claim 1, wherein determining, by the terminal, whether to release the RRC connection and return to the idle state based on the measurement result of the serving cell and the first threshold comprises:
   in response to that the measurement result of the serving cell is less than the first threshold, releasing, by the terminal, the RRC connection and returning to the idle state.

4. The method of any one of claim 1, wherein the configuration of the SRB1 is carried in an RRC connection setup message.

5. A method for controlling mobility of a terminal, comprising:
   after receiving configuration of a Signal Radio Bearer (SRB) 1, entering, by the terminal, a Radio Resource Control (RRC) connected state;
   in response to that the terminal in the RRC connected state does not receive configuration of a Data Radio Bearer (DRB) and/or configuration of an SRB2, reporting, by the terminal based on measurement configuration of the network side, a measurement result to the network side, wherein the measurement result is used by the network side to determine a target cell; and
   receiving, by the terminal, an RRC release message from the network side, wherein the RRC release message carries reference information of the target cell.

6. The method of claim 5, wherein the reference information of the target cell comprises at least one of: a Physical Cell Identifier (PCI), frequency information or Radio Access Type (RAT) information.

7. The method of claim 5, wherein the RRC release message further carries system broadcast information of the target cell.

8. The method of claim 5, wherein the configuration of the SRB1 is carried in an RRC connection setup message, and the measurement configuration is carried in an RRC reconfiguration message.

9. A device for controlling mobility of a terminal, applied to a terminal, the device comprising:
   a memory storing processor-executable instructions; and
   a processor configured to execute the stored processor-executable instructions to perform operations of:
   obtaining a first threshold configured by a network side;
   after receiving configuration of a Signal Radio Bearer (SRB) 1, entering a Radio Resource Control (RRC) connected state; and
   in response to that the terminal in the RRC connected state does not receive configuration of a Data Radio Bearer (DRB) and/or configuration of an SRB2, determining, based on a measurement result of a serving cell and the first threshold, whether to release an RRC connection and return to an idle state.

10. The device of claim 9, wherein obtaining the first threshold configured by the network side comprises:
    obtaining the first threshold from system broadcast information or a User Equipment (UE) dedicated signaling.

11. The device of claim 9, wherein determining whether to release the RRC connection and return to the idle state based on the measurement result of the serving cell and the first threshold comprises:
    in response to that the measurement result of the serving cell is less than the first threshold, releasing the RRC connection and returning to the idle state.

12. The device of claim 9, wherein the configuration of the SRB1 is carried in an RRC connection setup message.

13. A device for controlling mobility of a terminal, applied to a terminal, the device comprising:
    a memory storing processor-executable instructions; and
    a processor configured to execute the stored processor-executable instructions to perform the method of claim 5.

14. The device of claim 13, wherein reference information of the target cell comprises at least one of a Physical Cell Identifier (PCI), frequency information or Radio Access Type (RAT) information.

15. The device of claim 13, wherein the RRC release message further carries system broadcast information of the target cell.

16. The device of claim 13, wherein the configuration of the SRB1 is carried in an RRC connection setup message, and the measurement configuration is carried in an RRC reconfiguration message.

17. A non-transitory computer-readable storage medium having stored thereon computer-executable instructions that, when executed by a processor, cause the processor to perform the method of claim 1.

* * * * *